US008225747B2

(12) United States Patent
Markham et al.

(10) Patent No.: US 8,225,747 B2
(45) Date of Patent: Jul. 24, 2012

(54) TREAT DISPENSER FOR ANIMALS AND METHOD

(75) Inventors: Joseph P. Markham, Arvada, CO (US); Chuck Costello, Louisville, CO (US); Laura Bender, Evergreen, CO (US)

(73) Assignee: The KONG Company, LLC, Golden, CO (US)

( * ) Notice: Subject to any disclaimer, the term of this patent is extended or adjusted under 35 U.S.C. 154(b) by 223 days.

(21) Appl. No.: 12/579,043

(22) Filed: Oct. 14, 2009

(65) Prior Publication Data

US 2011/0083608 A1 Apr. 14, 2011

(51) Int. Cl.
*A01K 29/00* (2006.01)
(52) U.S. Cl. ............... 119/51.01; 119/710; 446/475
(58) Field of Classification Search ........... 119/51.01, 119/61.54, 702, 709, 710, 711, 57.91; 446/396, 446/475, 325; 222/164, 166, 463
See application file for complete search history.

(56) References Cited

U.S. PATENT DOCUMENTS

| | | | |
|---|---|---|---|
| 848,136 A | 3/1907 | Smith | |
| 901,762 A | 10/1908 | Wetzel | |
| 1,006,182 A | 10/1911 | Cousin | |
| 1,022,112 A | 4/1912 | Smith | |
| 1,031,095 A | 7/1912 | Smith | |
| 1,534,964 A | 4/1925 | Kahnweiler | |
| 1,789,333 A * | 1/1931 | Da Costa | 473/571 |
| 2,086,631 A * | 7/1937 | Munro | 119/711 |
| 2,554,516 A | 5/1951 | Anthony | |
| 2,601,767 A | 7/1952 | Wall | |
| 2,606,691 A * | 8/1952 | Lindly | 222/142.2 |
| 2,665,519 A | 1/1954 | Burkes | |
| 2,790,582 A | 4/1957 | Halpern | |
| 2,792,161 A | 5/1957 | Thomas | |
| 2,942,379 A | 6/1960 | Oman et al. | |
| 3,305,145 A | 2/1967 | Tebbutt | |
| 3,830,202 A | 8/1974 | Garrison | |
| 3,847,305 A * | 11/1974 | Tobin | 222/166 |
| D256,958 S | 9/1980 | Markham | |
| 4,223,636 A * | 9/1980 | Dishong | 119/709 |

(Continued)

FOREIGN PATENT DOCUMENTS

GB 2253329 9/1992

(Continued)

OTHER PUBLICATIONS

International Search Report for International (PCT) Application No. PCT/US10/51269, mailed Dec. 14, 2010.

(Continued)

*Primary Examiner* — Yvonne Abbott
(74) *Attorney, Agent, or Firm* — Sheridan Ross P.C.

(57) ABSTRACT

A dispenser device is provided for use by an animal to selectively dispense treats from the device. The device includes a body having an interior opening to receive treats, and an opening is formed in the body to allow dispensing of the treats. A base of the device includes a weighted material therein causing the device to reside in a normally upright position. Contact by the animal causes the device to tip, thereby allowing treats to fall through the opening in the body. Changing the amount and type of material used for the weighted material changes the characteristics of how the device moves when contacted by the animal that in turn, changes the rate and amount of treats that are dispensed.

16 Claims, 5 Drawing Sheets

U.S. PATENT DOCUMENTS

| | | | |
|---|---|---|---|
| 4,756,530 A * | 7/1988 | Karman | 273/113 |
| 4,784,288 A | 11/1988 | Jennings | |
| 4,802,444 A | 2/1989 | Markham et al. | |
| 4,907,537 A | 3/1990 | Shirk | |
| D307,339 S | 4/1990 | Markham et al. | |
| 4,971,203 A | 11/1990 | Weinstein | |
| 5,141,129 A | 8/1992 | Jennings | |
| 5,169,354 A | 12/1992 | Norton et al. | |
| 5,191,856 A | 3/1993 | Gordon | |
| RE34,352 E | 8/1993 | Markham et al. | |
| D344,161 S | 2/1994 | Markham | |
| 5,294,018 A | 3/1994 | Boucher | |
| D348,412 S | 7/1994 | Hazelton | |
| 5,379,922 A | 1/1995 | Paradoski | |
| D355,733 S | 2/1995 | O'Rourke et al. | |
| D373,859 S | 9/1996 | Markham et al. | |
| 5,620,109 A | 4/1997 | Madden | |
| 5,758,604 A | 6/1998 | Jorgensen | |
| 5,813,366 A | 9/1998 | Mauldin, Jr. | |
| 5,819,690 A | 10/1998 | Brown | |
| 5,843,366 A | 12/1998 | Shuert | |
| 5,865,146 A | 2/1999 | Markham | |
| 5,865,147 A | 2/1999 | Rubin | |
| D407,868 S | 4/1999 | Axelrod | |
| 5,904,118 A | 5/1999 | Markham | |
| 5,965,182 A | 10/1999 | Lindgren | |
| 6,073,581 A | 6/2000 | Wang | |
| 6,098,571 A | 8/2000 | Axelrod et al. | |
| 6,109,210 A | 8/2000 | Nasser | |
| 6,112,698 A * | 9/2000 | Zelinger | 119/61.54 |
| 6,129,053 A | 10/2000 | Markham et al. | |
| 6,158,390 A * | 12/2000 | Holtier et al. | 119/707 |
| 6,158,391 A | 12/2000 | Simonetti | |
| 6,167,841 B1 * | 1/2001 | Ho | 119/61.54 |
| 6,217,408 B1 * | 4/2001 | Willinger | 446/396 |
| 6,237,538 B1 | 5/2001 | Tsengas | |
| 6,439,166 B1 | 8/2002 | Markham | |
| D462,487 S | 9/2002 | Axelrod | |
| 6,526,912 B1 * | 3/2003 | Ottoson | 119/51.01 |
| 6,736,294 B2 * | 5/2004 | Smith | 222/463 |
| D505,233 S | 5/2005 | Viola | |
| 6,941,895 B2 | 9/2005 | St. Pierre | |
| D515,253 S | 2/2006 | Viola | |
| 7,082,895 B2 | 8/2006 | Barney et al. | |
| 7,146,934 B1 | 12/2006 | Staley | |
| D544,653 S | 6/2007 | Bryne | |
| D544,655 S | 6/2007 | Hass | |
| D546,507 S | 7/2007 | Byrne | |
| 7,246,574 B2 * | 7/2007 | Renforth | 119/711 |
| D564,715 S | 3/2008 | Lamstein | |
| D564,716 S | 3/2008 | Lamstein | |
| 7,389,748 B2 | 6/2008 | Shatoff et al. | |
| RE40,430 E | 7/2008 | Markham | |
| 7,426,903 B2 | 9/2008 | Simon | |
| D579,157 S | 10/2008 | Edwards | |
| 7,451,724 B2 | 11/2008 | Barney et al. | |
| D589,659 S | 3/2009 | Semler | |
| 7,536,978 B2 | 5/2009 | Washington et al. | |
| RE40,872 E | 8/2009 | Markham | |
| 7,574,978 B1 * | 8/2009 | Peterson | 119/709 |
| D603,111 S | 10/2009 | Hass | |
| 7,600,488 B2 * | 10/2009 | Mann | 119/710 |
| 7,681,763 B2 | 3/2010 | McGuyer | |
| D620,207 S | 7/2010 | Byrne | |
| 7,878,151 B2 | 2/2011 | Tsengas | |
| 7,905,491 B2 * | 3/2011 | Gray | 273/450 |
| D642,342 S | 7/2011 | Shatoff et al. | |
| 2002/0073934 A1 | 6/2002 | Barney et al. | |
| 2005/0045115 A1 * | 3/2005 | Mann | 119/711 |
| 2007/0283900 A1 | 12/2007 | Jager | |
| 2008/0121190 A1 | 5/2008 | Moulton | |
| 2008/0141948 A1 | 6/2008 | Renforth et al. | |
| 2009/0000565 A1 | 1/2009 | Bryce | |
| 2009/0038559 A1 | 2/2009 | Markham | |
| 2009/0038560 A1 | 2/2009 | Markham | |
| 2011/0139815 A1 * | 6/2011 | Benson | 222/1 |

FOREIGN PATENT DOCUMENTS

| | | |
|---|---|---|
| JP | 2003-102872 | 4/2003 |
| WO | WO 95/35137 | 12/1995 |
| WO | WO 98/52424 | 11/1998 |

OTHER PUBLICATIONS

Written Opinion for International (PCT) Application No. PCT/US10/51269, mailed Dec. 14, 2010.

U.S. Appl. No. 29/398,255, filed Jul. 28, 2011, Costello et al.

"Bobble Bone Treat Dispensing Dog Toy" Q quirky, available in store Feb. 3, 2011, found at http://www.quirky.com/products/83-Bobble-Bone-Treat-Dispensing-Dog-Toy, 6 pages.

Jess "Introducing . . . Bobble Bone", a quirky blog, Feb. 2, 2011, 6 pages, found at http://aquirkyblog.com/2011/02/introducing-bobble-bone/.

U.S. Appl. No. 13/247,039, filed Sep. 28, 2011, Costello.

International Preliminary Report on Patentability for International (PCT) Patent Application No. PCT/US2010/051269, mailed Apr. 26, 2012, 7 pages.

* cited by examiner

TREAT DISPENSER FOR ANIMALS AND METHOD

FIELD OF THE INVENTION

The present invention relates to pet toys having the capability to dispense food or treats, and more particularly, to a treat dispenser and method wherein the animal may selectively dispense treats, and the dispenser includes a weighted base causing the toy to return to a normal upright position after being manipulated by the animal.

BACKGROUND OF THE INVENTION

Interactive toys for pets have become quite popular. Animal behaviorists have validated many benefits to an animal that is stimulated, preoccupied, or otherwise engaged in productive interaction with a pet toy. Chew toys provide needed mastication for animals such as dogs. Throw toys provide overall physical exercise for dogs. Chew toys with treats provide both mastication and extended interaction since the animal's interest can be better maintained with the possibility of receiving an edible treat.

A number of inventions have been developed for increasing the length of time an animal may interact with a toy. Some of the inventions include pet toys that may enable food or treats to be dispensed from the toy. Toys with edible treats have proven to remediate separation anxiety experienced by some pets. By increasing the intensity and length of time the animal is occupied, the animal may be less prone to engage in negative behaviors.

One example of an animal food dispenser includes the invention disclosed in U.S. Pat. No. 6,526,912. This reference more specifically discloses a dispenser having a base portion and an upper portion defined by at least one wall enclosing a container cavity. An opening is formed in the upper portion to access the container cavity. A weighted body is fixed to the base of the dispenser, and provides a means for returning the dispenser to an upright position after the dispenser has been tipped or moved by the animal. The dispenser can be moved on a surface in an oscillating and/or sliding motion by the animal for dispensing a unit from the opening.

While the prior art may disclose various methods for dispensing treats or food, there is still a need to provide a treat dispensing device in which the animal has better control in selectively dispensing the treats. There is also a need to provide a device that is made simpler for loading the treats and cleaning the device. There is also a need to provide a device so that the movement or action of the device can be varied based upon a selected amount of weight that is placed in the base, and that can be adjusted by the user. Finally, there is also a need to provide the aforementioned improvements/advantages in a structurally simple, yet reliable construction.

SUMMARY OF THE INVENTION

In accordance with the present invention, a treat or food dispensing device and method are provided to enable an animal to selectively dispense treats/food from the device. The word "treat" hereinafter is meant to include all animal foodstuffs that can be consumed by an animal. Treats may take various forms such as uniformly sized nuggets or the treats can be irregularly sized and shaped.

In accordance with the device of the present invention, a dispenser is provided having a body, a base, and an interconnecting assembly or piece that interconnects the body to the base. The body is preferably hollow, and receives treats as loaded therein by the pet owner or caregiver. A weighted material is loaded in the base. Preferably, the weighted material is capable of shifting or moving in the base and is therefore not fixed to the base. The material used can be, for example, sand or other granular material, or ball bearings. The base is filled with a desired amount of the material to maintain the toy in an upright position and to return the toy to the upright position after being tipped or displaced. The interconnecting assembly includes an integral cover that covers the weighted material within the base. The upper end of the interconnecting assembly may be threadably engaged with the lower portion of the body. An opening of a desired shape and size is formed in the body to allow dispensing of treats retained within the body.

In accordance with the method of the present invention, a selected amount of weighted material is placed in the base. The amount of weighted material can be selected to adjust the movement and oscillation characteristics of the device when contacted by the animal. The selected amount of weighted material dictates the manner in which the device will return to its normal upright position after being contacted by an animal. For example, the greater amount of weighted material present, the greater the amount of force required to tip the device. Reducing the amount of weighted material in the base allows the device to be more easily tipped or moved. The longer time period in which the device is tipped may provide greater opportunity for dispensing of treats held within the body. The particular manner in which the device oscillates after being contacted is also affected by the amount of weight placed within the base. Another factor determining the oscillation characteristics of the device is the amount of space or gap between the cover of the interconnecting piece and the top surface of the weighted material. A greater cavity size enables greater shifting and movement of the weighted material, and also generally results in the device staying in a tipped or angled position for a greater amount of time. Thus, in addition to adjusting the amount of weighted material present, a user may also adjust the volume of the weighted material in order modify the oscillation and movement characteristics of the device.

Other features and advantages of the present invention will become apparent from a review of the following detailed description, taken in conjunction with the drawings.

BRIEF DESCRIPTION OF THE DRAWINGS

The present invention will now be further described in the Detailed Description which follows with reference being made to the following drawings in which.

DETAILED DESCRIPTION

Figure 1:
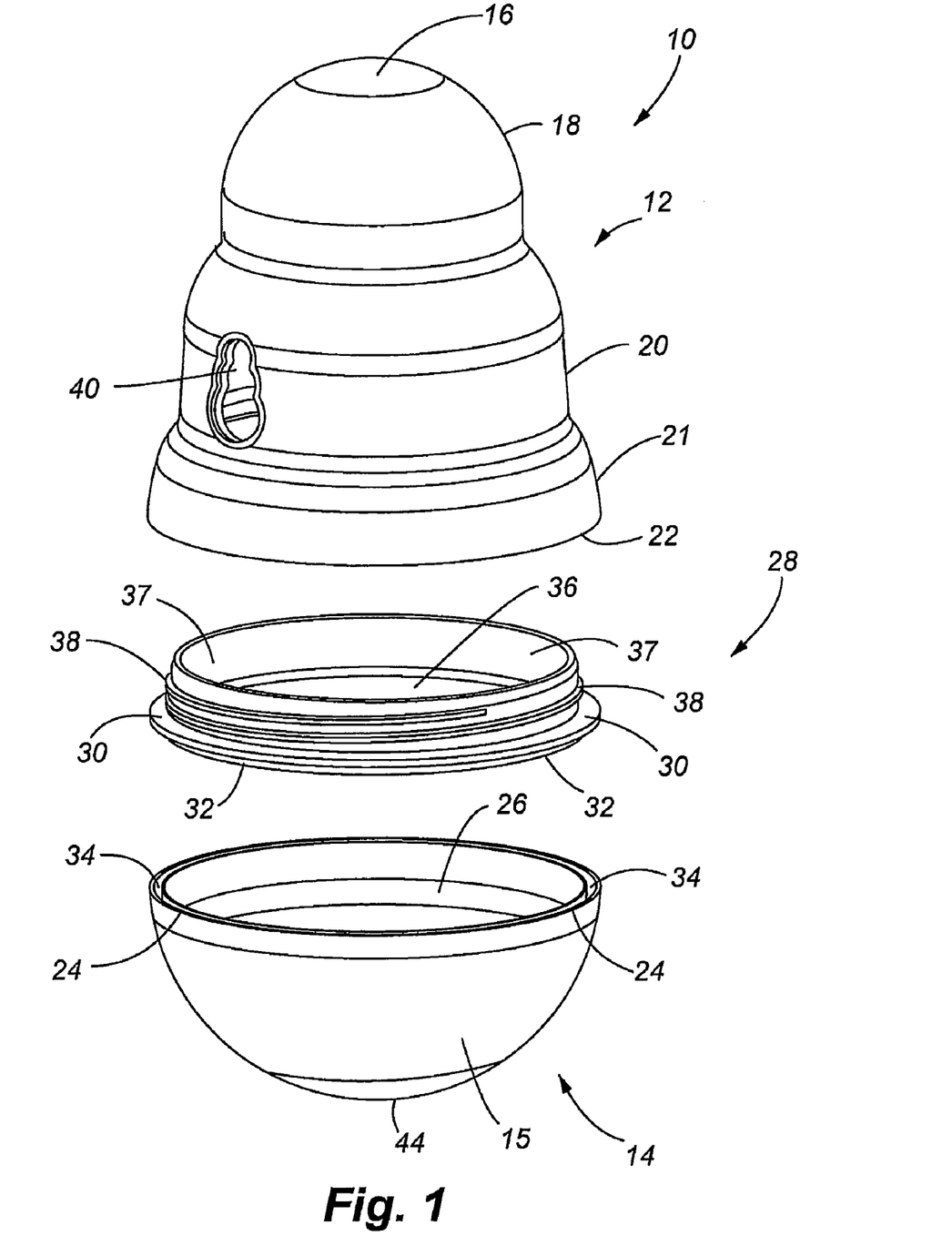
FIG. 1 illustrates an exploded perspective view of the dispenser of the present invention.

FIG. 1 illustrates the dispenser device 10 according to the present invention in a preferred embodiment. The dispenser 10 includes three primary components, namely, a body 12, a base 14, and an interconnecting piece or assembly 28. The interconnecting assembly is threadably engaged with the body 12. The interconnecting assembly is preferably frictionally engaged and sealed to the base 14.

The body 12 as viewed in FIG. 1 has a top 16, an upper section or tier 18, and a middle section or tier 20 having a greater diameter or size as compared to the upper section. The body further includes a lower tier or section 21 that has a larger diameter as compared to the middle section or tier 20. Thus, the body 12 has a progressively larger size when comparing the top 16 as compared to the lower edge 22 of the lower section 21. A treat dispensing opening 40 is formed in the wall of the body, and communicates with the open interior space within the body. Treats are dispensed from the opening 40 by the animal tipping/displacing the device, causing one or more treats to fall through the opening 40. As shown, the opening 40 is also a 3-tiered shape having a larger lower section or tier, a smaller middle section or tier, and a smallest upper section or upper tier.

Referring to the base 14, it includes a sidewall 15, a substantially flat lower surface 44, an upper edge 24, and an interior cavity 26 that is adapted to receive a weighted material, as discussed further below with respect to FIG. 3.

The interconnecting piece or assembly 28 is characterized by an upper extension 37, and a plurality of threads 38 formed on the upper extension 37. A flange 30 forms a lower portion of the assembly 28, and a peripheral lower extension 32 protrudes from the flange 30.

Figures 2, 3:
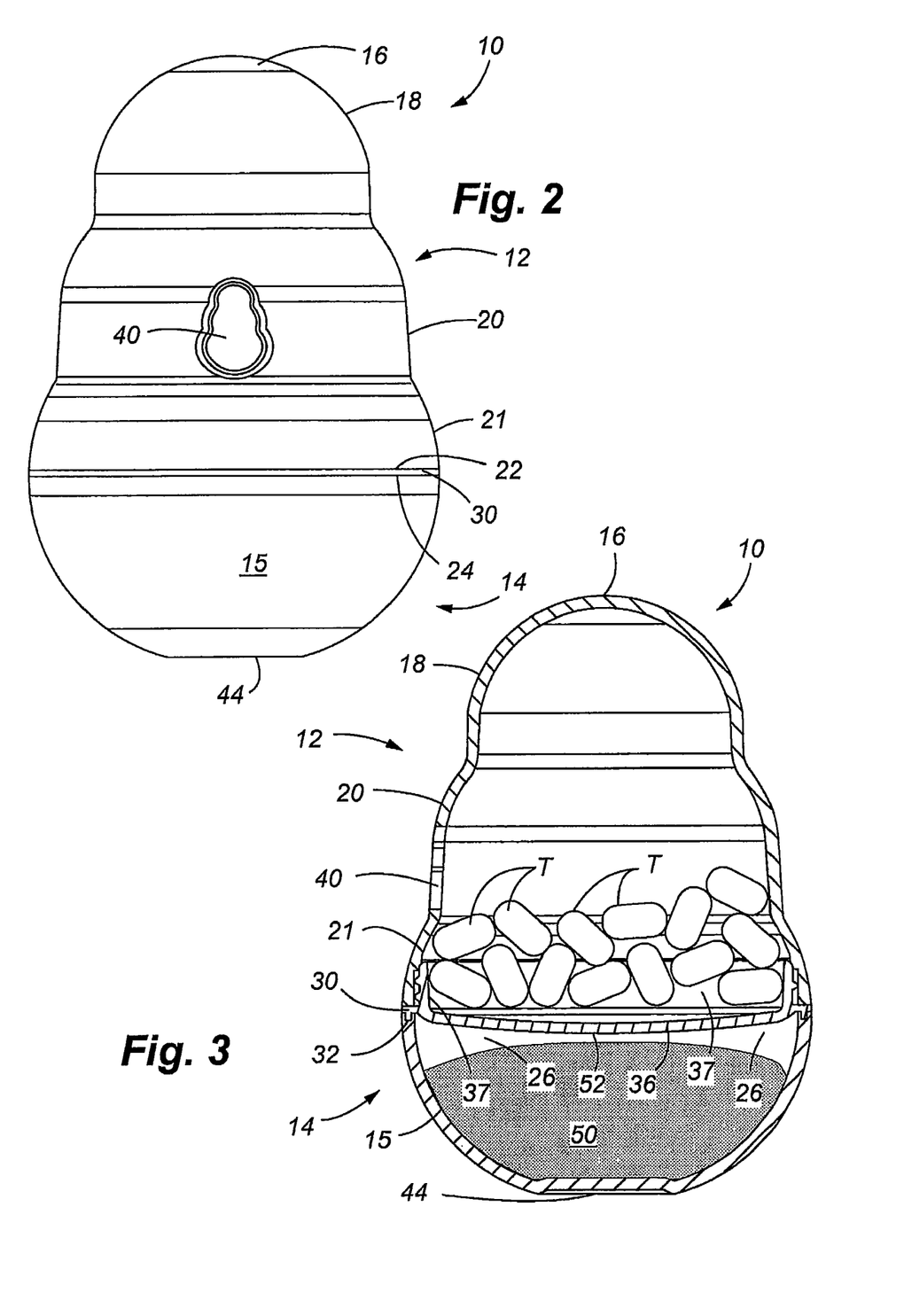
FIG. 2 is an elevation view of the dispenser.
FIG. 3 is a vertical cross sectional view of FIG. 2 showing the device loaded with treats.

Also referring to FIGS. 2 and 3, the device 10 is shown as being assembled in which a weighted material, such as granular material 50, fills a portion of the cavity 26 of the base 14. The peripheral lower extension 32 as shown, is frictionally received within a peripheral groove 34 formed on the upper edge 24 of the base 14. A cover 36 extends between and is joined to the interconnecting assembly 28, thereby covering or encapsulating the granular material 50 within the cavity 26. As also shown, a desired sized gap 52 exists between the upper surface of the granular material 50 and the lower facing surface of the cover 36.

A desired amount and type of granular material is placed within the cavity 26 of the base 14. The weight and volume of the granular material will dictate the motion/oscillation of the device when tipped. A heavier material placed within the base will make the device more difficult to tip and therefore, more difficult to dispense treats that may reside at an elevation below the level of the opening 40. Placing a lesser volume of granular material within the cavity 26 enables the granular material to more easily shift or move in the direction the device is tipped or displaced, thereby allowing the device to be placed in the tipped position for a longer period of time prior to the device rotating or oscillating back to its upright position. This particular aspect of the invention may be advantageous for increasing the dispense rate of the toy. In any event, the weighted material of the present invention is not fixed to the base and is allowed to naturally shift or move according to the contact made by the animal with the device.

Figure 4:
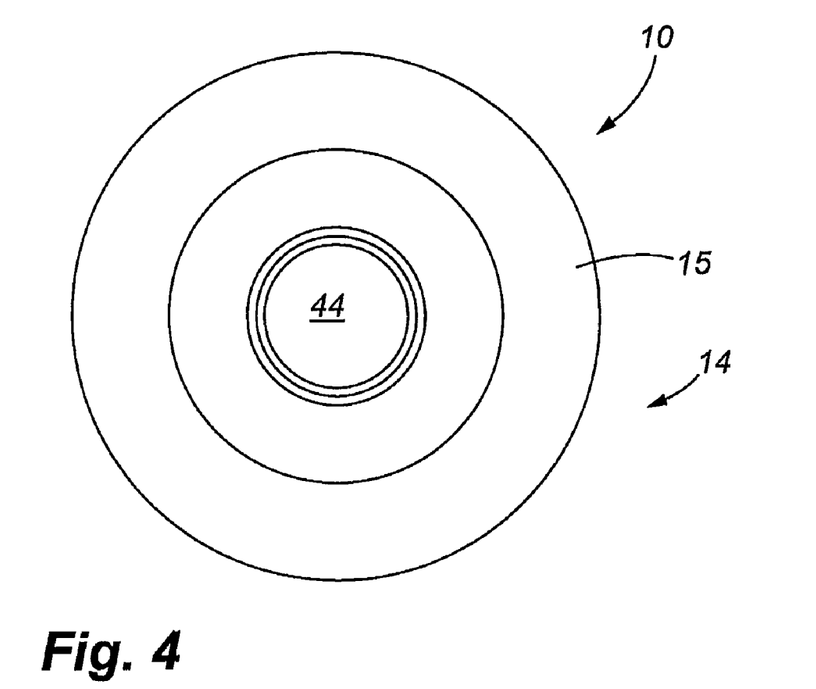
FIG. 4 is a bottom plan view.
Figure 5:
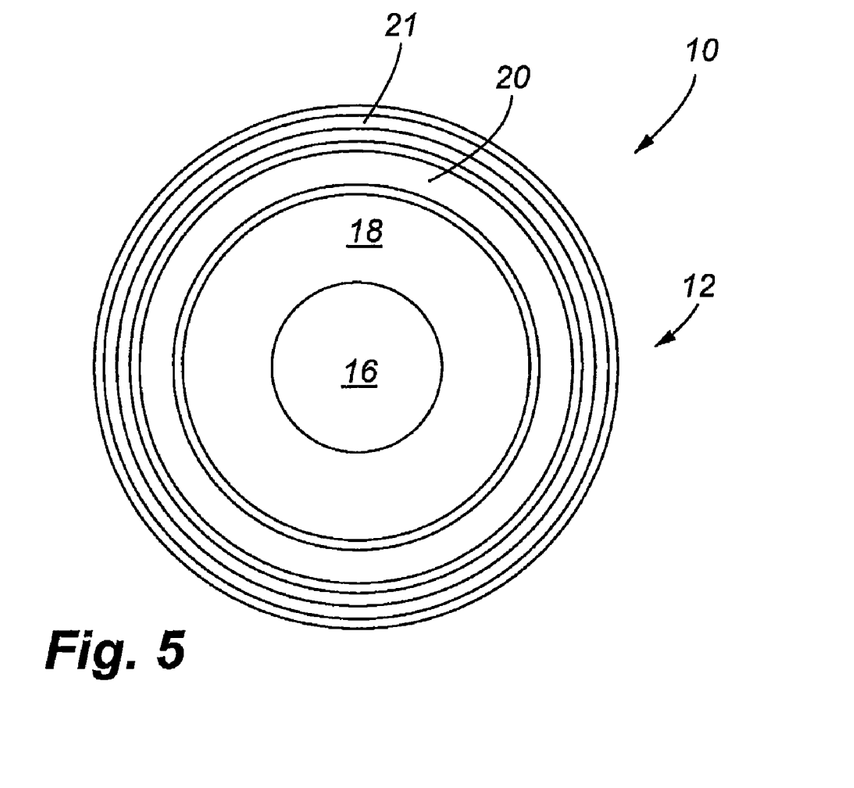
FIG. 5 is a top plan view.
Figures 6, 7:
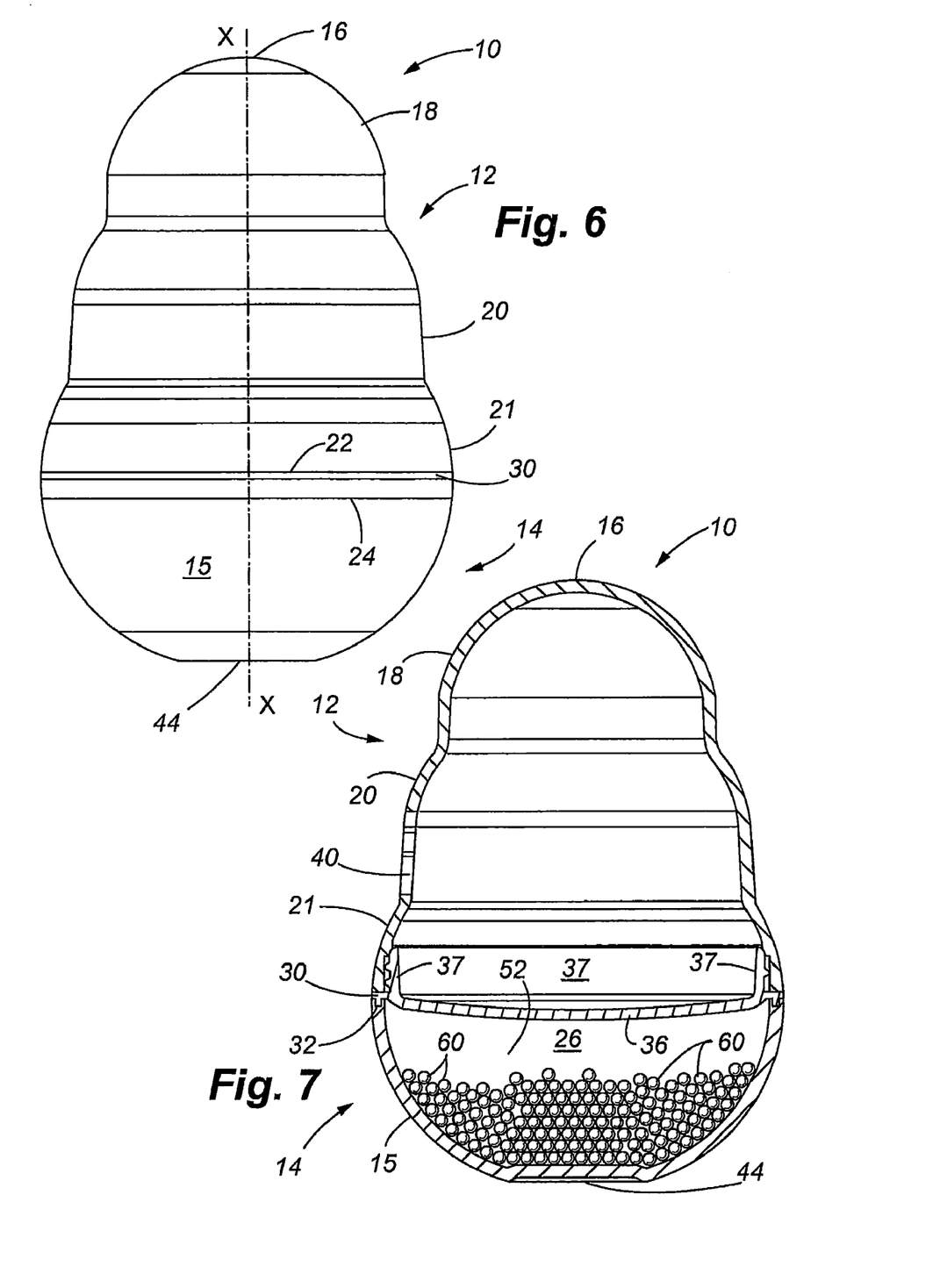
FIG. 6 is an elevation view of the opposite side of the device as compared to FIG. 1.
FIG. 7 is another vertical cross sectional view but illustrating a different type of weighted material in the base.

FIGS. 4, 5 and 6 further show the tiered or layered structure of the present invention in which the base occupies a larger area, and the upper portion of the device is centered above the base. This arrangement allows the device to have a stable base and with an adequate amount of weight in the cavity of the base, the device will have a tendency to move to an upright position in which the flat lower surface 44 is in contact with the surface to which it is mounted. The device is also symmetrical about the longitudinal axis X-X, as shown in FIG. 6.

In order to load treats within the body, the body 12 is simply unscrewed from the interconnecting assembly 28, treats are placed within the interior opening of the body 12, and then the body 12 is reattached to the interconnecting assembly 28.

FIG. 7 illustrates a different type of weighted material 60 placed in the cavity 26 of the base 14. More specifically, the weighted material 60 is depicted as, for example, ball bearings or small weighted spheres. This type of material may be heavier than the granular material 50 and may therefore occupy a lesser volume in the cavity. Also, the material 60 may shift or move more easily as compared to the granular material 50. Therefore, the movement or oscillation characteristics of the device would be altered when contacted by the animal such that the device may be maintained in a tipped position for a longer duration after contact.

Figure 8:
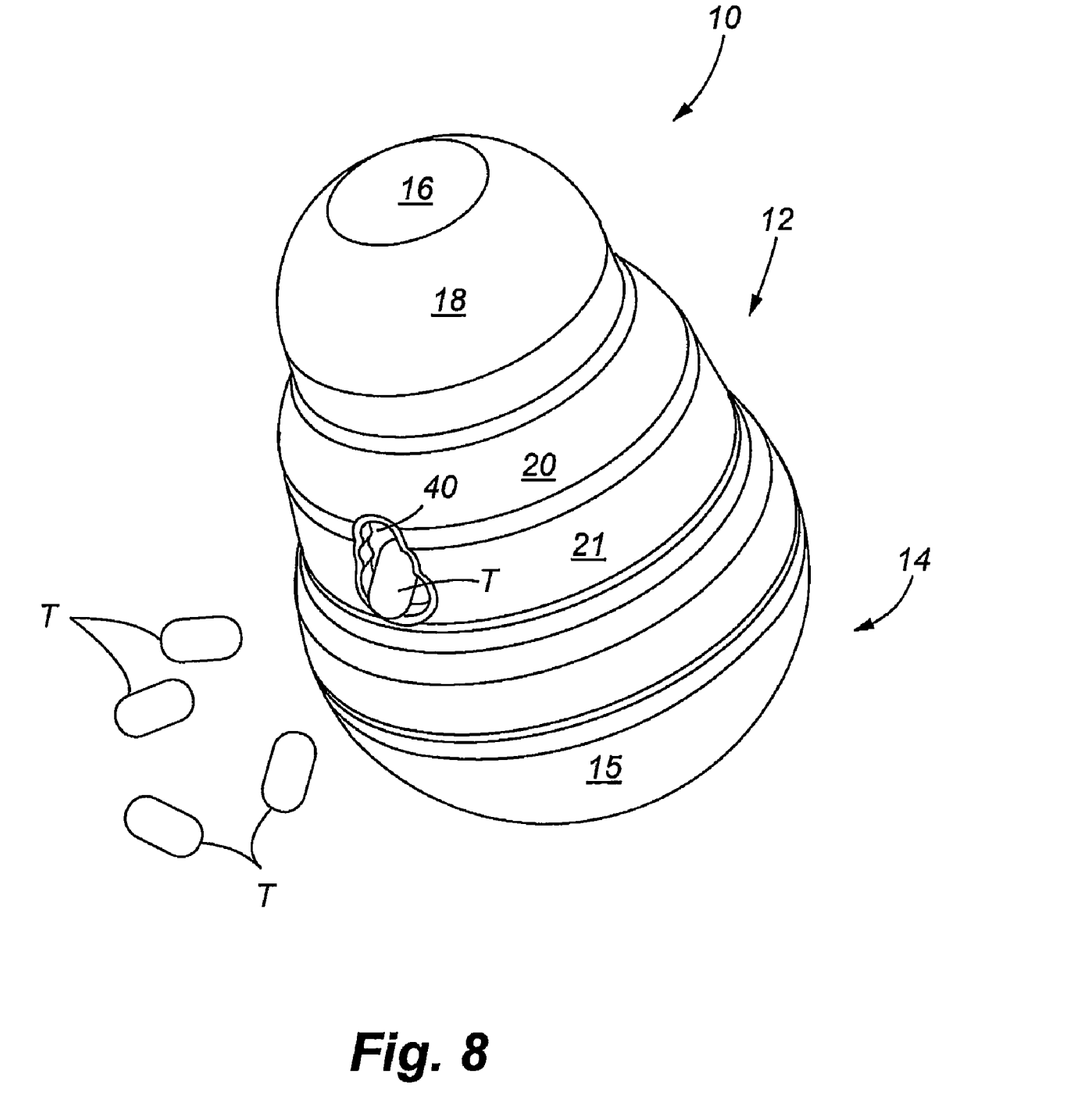
FIG. 8 is a perspective view of the dispenser illustrating treats being dispensed from the dispenser.

FIG. 8 illustrates the device in use in which the device has been tipped, and some of the treats T have been dispensed from the device. As mentioned, the non-static or moveable capability of the weighted material 50/60 provides opportunities for different types of device oscillations or movements to more selectively dispense different types of treats that may be used with the dispenser. It shall be understood that the size and shape of the treats also affects the number of treats dispensed when evaluating the desired amount of treats to be dispensed in a play period for the animal.

Based upon the foregoing, a treat dispensing device and method are provided for selectively dispensing treats by action of an animal. The tipping action or motion of the device can be altered by varying the amount and type of weighted material that is placed within the base. The removable aspect of the base with respect to the body enables a pet owner or caregiver to easily charge or load the body with treats. This feature also allows better interior access to clean the device.

Although only one treat opening 40 is illustrated in the preferred embodiment, it shall be understood that additional openings 40 can be formed on the body, and spaced at different locations around the body in order to provide additional opportunities for treats to be dispensed from the device.

Although the present invention has been disclosed in a preferred embodiment, it shall be understood that various other changes and modifications can be made to the invention in accordance with the scope of the claims appended hereto.

What is claimed is:

1. A dispenser for dispensing treats, said dispenser comprising:
   a body having an interior opening;
   a base spaced from the body, and having a cavity formed therein;
   an interconnecting assembly for interconnecting a lower edge of the body to an upper edge of the base, and a cover mounted to the interconnecting assembly for covering the cavity of the base;
   a treat receiving opening formed in the body for dispensing treats therethrough; and
   a weighted, moveable material disposed in the cavity.

2. A dispenser, as claimed in claim 1, wherein:
   said body has at least two sections of differing sizes.

3. A device, as claimed in claim 1, wherein:
   said body has at least three sections of differing sizes.

4. A device, as claimed in claim 1, wherein:
   said body is threadably connected to said base interconnecting assembly.

5. A device, as claimed in claim 1, wherein:
   said interconnecting assembly is frictionally engaged with said base, and said cover seals said weighted material within said cavity of said base.

6. A device, as claimed in claim 1, wherein:
said treat receiving opening is formed in the body adjacent the lower edge of said body.

7. A device, as claimed in claim 1, wherein:
said treat receiving opening includes a plurality of treat receiving openings.

8. A device, as claimed in claim 1, wherein:
said base includes a lower flat surface.

9. A device, as claimed in claim 1, wherein:
said weighted material includes a granular material.

10. A device, as claimed in claim 1, wherein:
said weighted material includes a plurality of ball bearings.

11. A device, as claimed in claim 1, wherein:
a gap extends between a lower facing surface of said cover and an upper surface of said weighted material.

12. A method of dispensing treats from a device when contacted by an animal playing with the device, said method comprising:
    providing the device including:
        (i) a body having an interior opening;
        (ii) a base spaced from the body, and having a cavity formed therein;
        (iii) an interconnecting assembly for interconnecting a lower edge of the body to an upper edge of the base, and a cover mounted to the interconnecting assembly for covering the cavity of the base;
        (iv) a treat receiving opening formed in the body for dispensing treats therethrough;
        (v) a weighted, moveable material disposed in the cavity;
    removing the body from the interconnecting assembly;
    loading the base with selected treats;
    reattaching the body to the interconnecting assembly; and
    causing an animal to play with the device wherein the device is tipped from a normal upright position to a tipped position, thereby causing treats to be dispensed through the at least one treat receiving opening.

13. A method, as claimed in Claim 12, wherein:
said weighted, movable material shifts within the said cavity based upon movement of the device.

14. A method of dispensing pet treats comprising:
a body having an interior opening;
a base having a cavity formed therein;
an interconnecting assembly for interconnecting the body to the base, and a cover mounted to the interconnecting assembly for covering the cavity of the base;
a treat receiving opening formed in the body for dispensing treats; and
adjusting the type and/or amount of weighted material placed the cavity of the base to selectively change oscillatory characteristics of the device when it is tipped by contact with the animal.

15. A method, of dispensing pet treats comprising:
providing a body having (i) an interior opening;
(ii) a base having a cavity formed therein;
(iii) an interconnecting assembly for interconnecting the body to the base, and a cover mounted to the interconnecting assembly for covering the cavity of the base;
(iv) a treat receiving opening formed in the body for dispensing treats; and a weighted moveable material placed in the cavity wherein the weighted moveable material shifts within the cavity based upon movement of the device, and the shifting of said weighted movable material causes the device to be maintained in the tipped position for a longer period of time as compared to if the weighted movable material was fixed to the base.

16. A dispenser for dispensing treats, said dispenser comprising:
a body having an interior opening;
a base spaced from the body, and having a cavity formed therein;
an interconnecting assembly for interconnecting a lower edge of the body to an upper edge of the base, and a cover mounted to the interconnecting assembly for covering the cavity of the base;
a treat receiving opening formed in the body for dispensing treats therethrough; and
means for maintaining the dispenser in the normally upright position, said means for maintaining being movable within said base in response to movement of said dispenser as caused by an animal contacting said dispenser.

\* \* \* \* \*

UNITED STATES PATENT AND TRADEMARK OFFICE
CERTIFICATE OF CORRECTION

PATENT NO.         : 8,225,747 B2                                        Page 1 of 1
APPLICATION NO.    : 12/579043
DATED              : July 24, 2012
INVENTOR(S)        : Joseph P. Markham, Chuck Costello and Laura Bender It is certified that error appears in the above-identified patent and that said Letters Patent is hereby corrected as shown below:

Column 4, Lines 62-63, of Claim 4: "said base interconnecting assembly." should read "said interconnecting assembly."

Column 6, Line 7, of Claim 14: "placed the cavity" should read "placed in the cavity"

Signed and Sealed this
Twenty-fifth Day of September, 2012

David J. Kappos
*Director of the United States Patent and Trademark Office*

UNITED STATES PATENT AND TRADEMARK OFFICE
CERTIFICATE OF CORRECTION

PATENT NO.         : 8,225,747 B2                                              Page 1 of 1
APPLICATION NO.    : 12/579043
DATED              : July 24, 2012
INVENTOR(S)        : Joseph P. Markham, Chuck Costello and Laura Bender It is certified that error appears in the above-identified patent and that said Letters Patent is hereby corrected as shown below:

In the Claims

Column 5, line 31, of Claim 12: "loading the base with selected treats;" should read "loading the body with selected treats;"

Signed and Sealed this
Eighth Day of April, 2014

Michelle K. Lee
*Deputy Director of the United States Patent and Trademark Office*